(12) United States Patent
Yan et al.

(10) Patent No.: US 12,276,849 B2
(45) Date of Patent: Apr. 15, 2025

(54) OPTICAL MODULE

(71) Applicant: Dongguan Luxshare Technologies Co., Ltd, Dongguan (CN)

(72) Inventors: QianBing Yan, Dongguan (CN); Min-Sheng Kao, Taipei (TW); ChunFu Wu, Dongguan (CN); Yueh-Kuo Lin, Taipei (TW); LinChun Li, Dongguan (CN); Chung-Hsin Fu, Taipei (TW)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 381 days.

(21) Appl. No.: 18/075,070

(22) Filed: Dec. 5, 2022

(65) Prior Publication Data
US 2024/0004150 A1 Jan. 4, 2024

(30) Foreign Application Priority Data
Jun. 30, 2022 (CN) .......................... 202210756821.2

(51) Int. Cl.
*G02B 6/42* (2006.01)

(52) U.S. Cl.
CPC ......... *G02B 6/4245* (2013.01); *G02B 6/4239* (2013.01); *G02B 6/424* (2013.01); *G02B 6/4244* (2013.01); *G02B 6/4267* (2013.01); *G02B 6/4268* (2013.01); *G02B 6/428* (2013.01); *G02B 6/4246* (2013.01); *G02B 6/4269* (2013.01)

(58) Field of Classification Search
CPC .... G02B 6/4239; G02B 6/424; G02B 6/4244; G02B 6/4245; G02B 6/4246; G02B 6/4267; G02B 6/4268; G02B 4/4269; G02B 6/428
See application file for complete search history.

(56) References Cited

U.S. PATENT DOCUMENTS

| 7,303,339 B2 | 12/2007 | Zhou et al. | |
| 10,989,870 B2 * | 4/2021 | Lin | H04B 10/503 |
| 11,828,991 B2 * | 11/2023 | Du | G02B 6/4266 |

(Continued)

FOREIGN PATENT DOCUMENTS

| CN | 104934386 A | 9/2015 |
| CN | 206059902 U | 3/2017 |

(Continued)

*Primary Examiner* — Daniel Petkovsek
(74) *Attorney, Agent, or Firm* — Birch, Stewart Kolasch & Birch, LLP (57) ABSTRACT

Disclosed is an optical module, including a circuit board, a thermally conductive substrate, a structural adhesive, a silicon photonic chip, a laser assembly, and a fiber array assembly coupled to the silicon photonic chip. The thermally conductive substrate includes a first surface, a second surface, and a first bearing seat, a second bearing seat and a third bearing seat disposed on the first surface and exposed from the opening of the circuit board. The area of the second surface is smaller than that of the first surface. Part of the first surface contacts the circuit board. The thermally conductive substrate is fixed to the circuit board by the structural adhesive. The silicon photonic chip is disposed on the first bearing seat, the laser assembly is disposed on the second bearing seat, and a joint of the fiber array assembly is disposed on the third bearing seat.

15 Claims, 11 Drawing Sheets

(56) References Cited

U.S. PATENT DOCUMENTS

| | | | |
|---|---|---|---|
| 12,007,612 B2 * | 6/2024 | Chen | G02B 6/4246 |
| 12,025,842 B2 * | 7/2024 | Shao | G02B 6/421 |
| 12,197,021 B2 * | 1/2025 | Du | G02B 6/421 |
| 2021/0239922 A1 | 8/2021 | Du et al. | |
| 2023/0116287 A1 * | 4/2023 | Zheng | G02B 6/4278 |
| | | | 385/33 |

FOREIGN PATENT DOCUMENTS

| | | |
|---|---|---|
| CN | 110703391 A | 1/2020 |
| CN | 113093349 A | 7/2021 |
| CN | 113359245 A | 9/2021 |
| CN | 214540146 U | 10/2021 |
| CN | 214795313 U | 11/2021 |
| CN | 216083184 U | 3/2022 |
| TW | 201608293 A | 3/2016 |
| TW | 201830073 A | 8/2018 |
| WO | WO 2022/083149 A1 | 4/2022 |

\* cited by examiner

OPTICAL MODULE

CROSS REFERENCE TO RELATED APPLICATION

This application claims the priority benefit of Chinese Patent Application Serial Number 202210756821.2, filed on Jun. 30, 2022, the full disclosure of which is incorporated herein by reference.

BACKGROUND

Technical Field

The present disclosure relates to the field of communication technologies, and in particular, to an optical module.

Related Art

In modern communication systems, the demand for network traffic grows very rapidly. Therefore, fiber broadband has gradually become the mainstream to make optical modules very important. In the process of transmitting the signal by the optical module, the electronic chip is responsible for transmitting an electrical signal from the system device to the optical chip, so that the optical chip is responsible for converting the electrical signal into an optical signal, and then transmits the optical signal through the optical fiber. In the process of receiving the signal by the optical module, the optical chip is responsible for converting the optical signal received through the optical fiber into the electrical signal and transmitting the electrical signal to the electronic chip, so that the electronic chip is responsible for transmitting the received electrical signal to the system device.

In the existing optical module, the base carrying the optical chip and the laser assembly is embedded in the through opening of the circuit board, so as to be fixed to the circuit board. However, under this configuration, there is a problem that the stability of the optical path is affected due to insufficient bonding firmness between the base and the circuit board. In addition, in order to reduce the loss of optical signal transmission, the end of the optical fiber used for coupling and connection with the optical chip usually needs to be fixed at the height of the same plane as the optical port of the optical chip by using a large amount of glue, which causes the problem that the stability of the optical path is affected due to the difference in the expansion coefficient between the glue and the base that carries the optical chip and the laser assembly.

Therefore, how to provide an optical module to solves the above technical problem is a problem to be solved by those skilled in the art at present.

SUMMARY

Embodiments of the present disclosure provide an optical module, which can solve the problem that the stability of the optical path is affected due to the insufficient bonding firmness between the base and the circuit board, and the difference in the expansion coefficient between the glue on which the optical fiber is fixed and the base carrying the optical chip and the laser assembly in the existing optical module.

In order to solve above-mentioned technical problem, the present disclosure is implemented as follows.

The present disclosure provides an optical module, which includes a circuit board, a thermally conductive substrate, a structural adhesive, a silicon photonic chip, a laser assembly, and an optical fiber array assembly. The circuit board is provided with a through opening. The thermally conductive substrate is fixed to the circuit board, and comprises a first surface, a second surface, a connecting end, a first bearing seat, a second bearing seat and a third bearing seat, wherein the first surface and the second surface are opposite to each other; the connecting end connects the first surface and the second surface; the first bearing seat, the second bearing seat and the third bearing seat are disposed on the first surface; the area of the second surface is smaller than that of the first surface; part of the first surface contacts the circuit board; and the first bearing seat, the second bearing seat and the third bearing seat are exposed from the through opening. The structural adhesive covers the connecting end and part of the circuit board to fix the thermally conductive substrate on the circuit board. The silicon photonic chip is disposed on the first bearing seat and electrically connected to the circuit board, and is configured to output a first optical signal and receive a second optical signal and a third optical signal. The laser assembly is disposed on the second bearing seat, and is configured to provide the third optical signal to the silicon photonic chip. The optical fiber array assembly includes an optical fiber array and a joint configured to fix an end of the optical fiber array, wherein the joint is glued to the third bearing seat to make the optical fiber array coupled and connected with the silicon photonic chip, to receive the first optical signal from the silicon photonic chip and provide the second optical signal to the silicon photonic chip; and a clearance area is provided between the optical fiber array near the joint and the thermally conductive substrate.

In the embodiment of the present disclosure, through the design that the area of the second surface is smaller than that of the first surface, the thermally conductive substrate is provided with an indentation structure, which is helpful for the structural adhesive to fill the inverted structure, thereby increasing the bonding firmness between the thermally conductive substrate and the circuit board. In addition, through the design that the silicon photonic chip is disposed on the first bearing seat, the laser assembly is disposed on the second bearing seat, and the joint of the optical fiber array assembly is disposed on the third bearing seat, all optical components used for transmitting optical signals (i.e., the silicon photonic chip, the laser assembly and the fiber array assembly) are disposed on the thermally conductive substrate, and the first bearing seat, the second bearing seat, and the third bearing seat have the same expansion coefficient, so as to ensure stable optical performance under different temperature environments.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The following embodiments describe the features and advantages of the present disclosure in detail, but do not limit the scope of the present disclosure in any point of view. According to the description, claims, and drawings, a person ordinarily skilled in the art can easily understand the technical content of the present disclosure and implement it accordingly.

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

Figure 1:
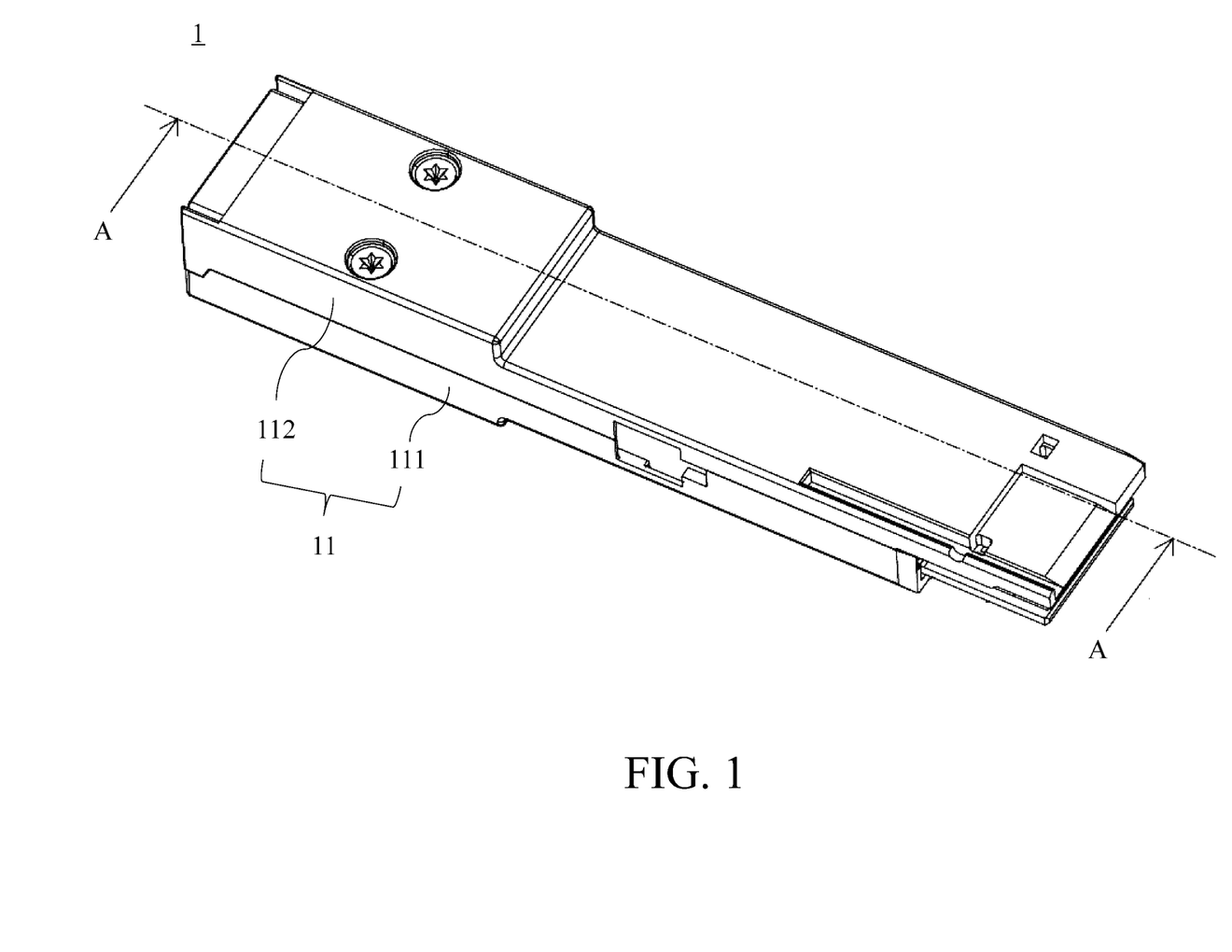
FIG. 1 is a combination diagram of an optical module according to an embodiment of the present disclosure.
Figure 2:
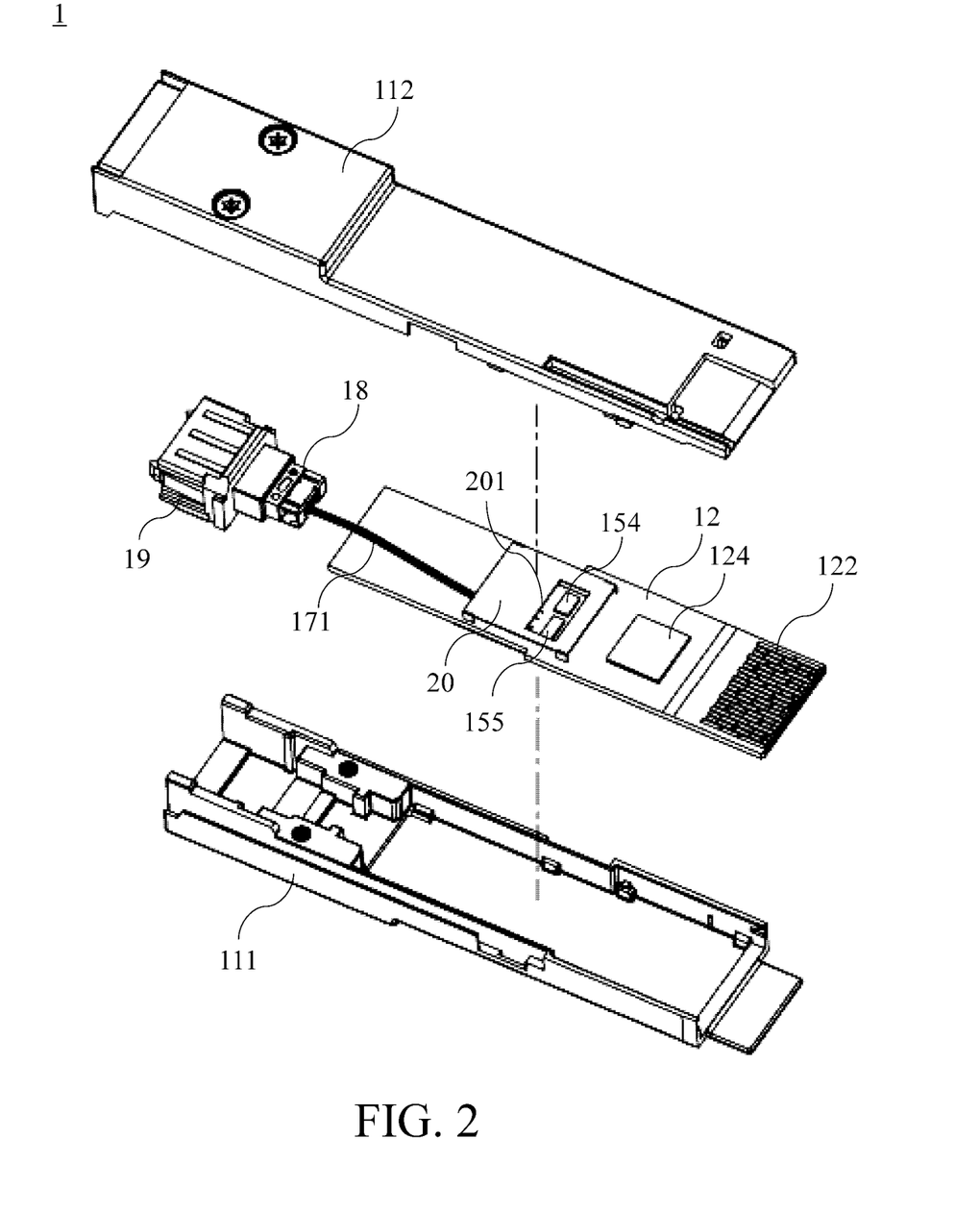
FIG. 2 is an exploded schematic diagram of a first perspective view of the optical module of FIG. 1.
Figure 3:
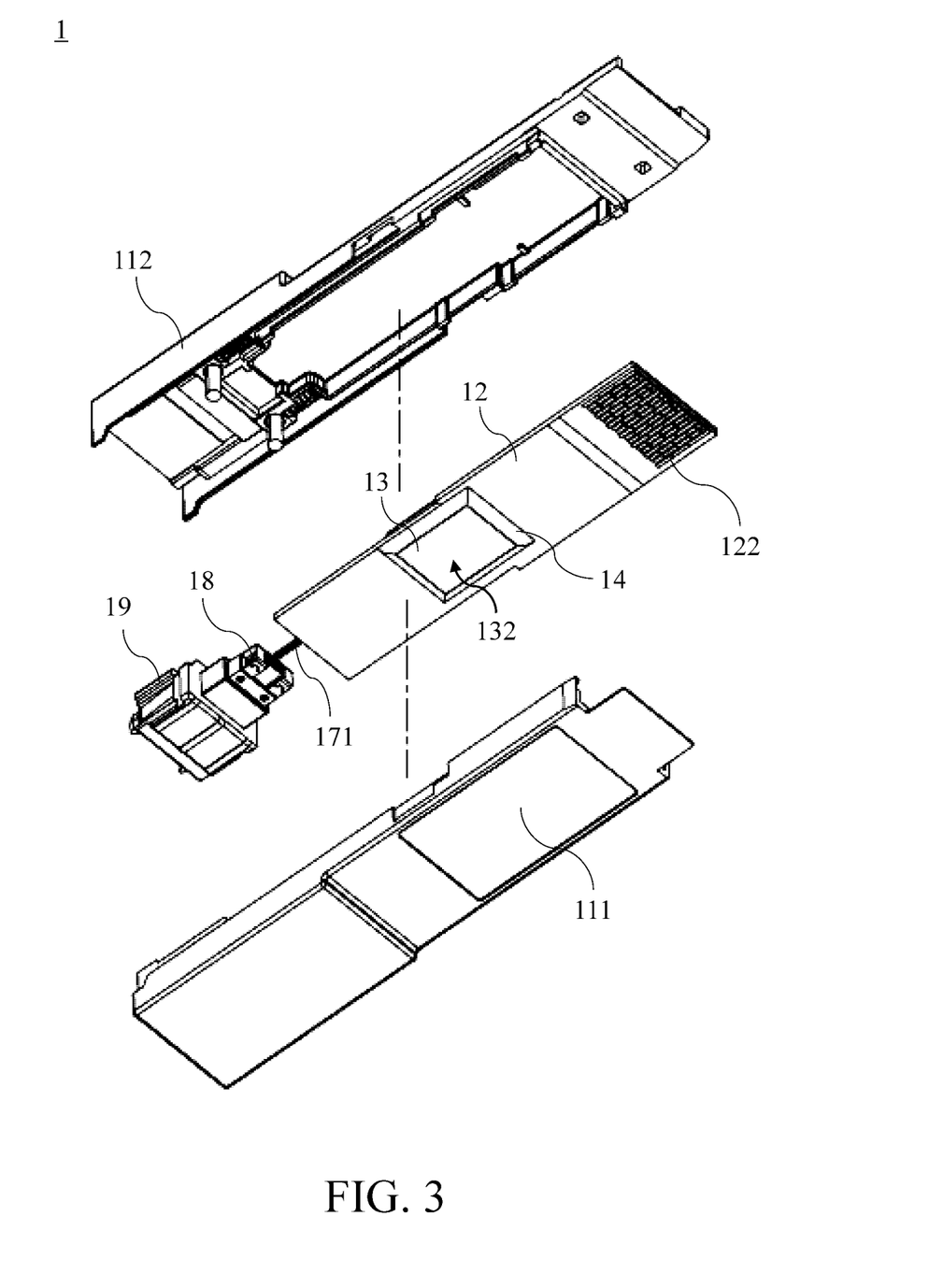
FIG. 3 is an exploded schematic diagram of a second perspective view of the optical module of FIG. 1.
Figure 4:
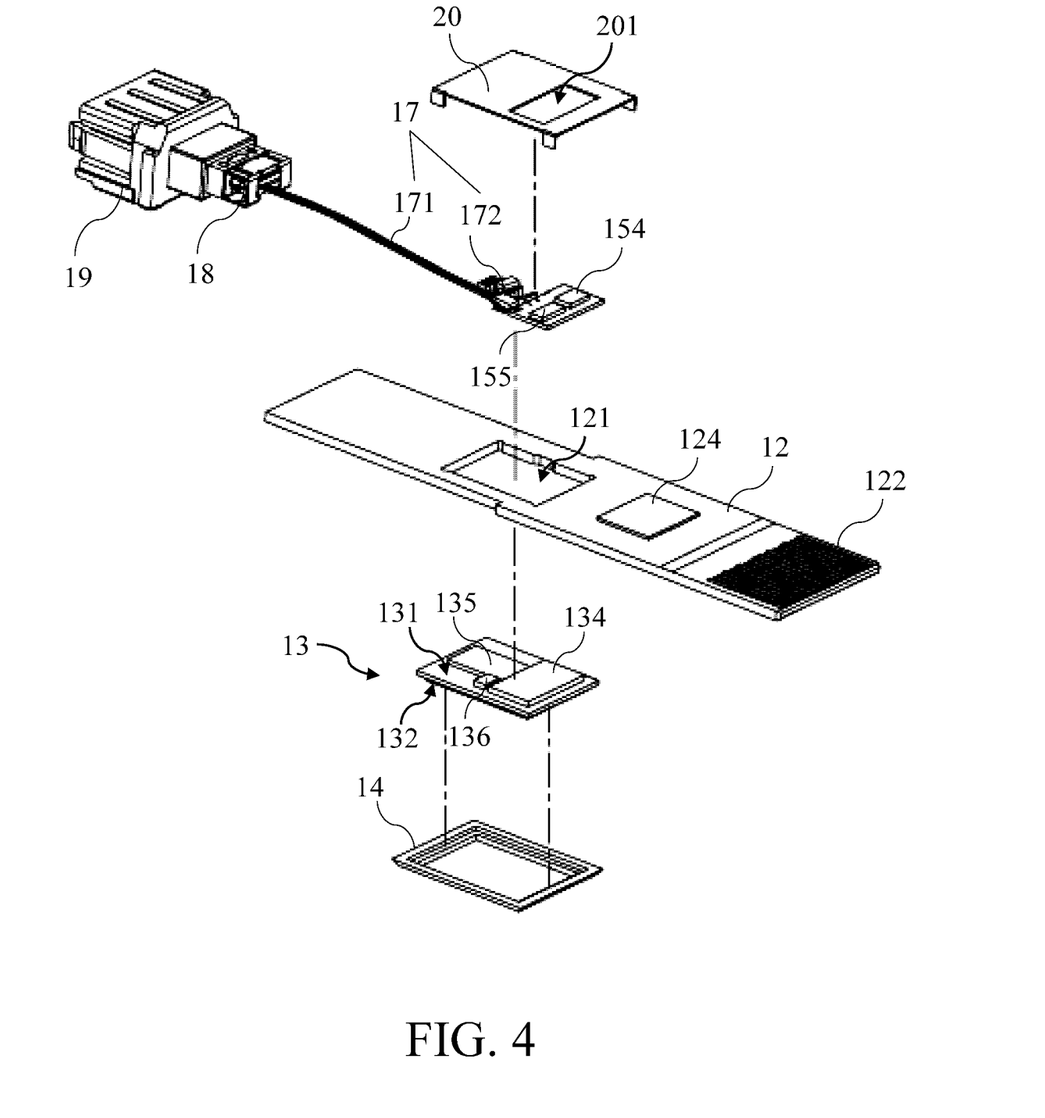
FIG. 4 is a partial exploded view of the optical module of FIG. 2.
Figure 5:
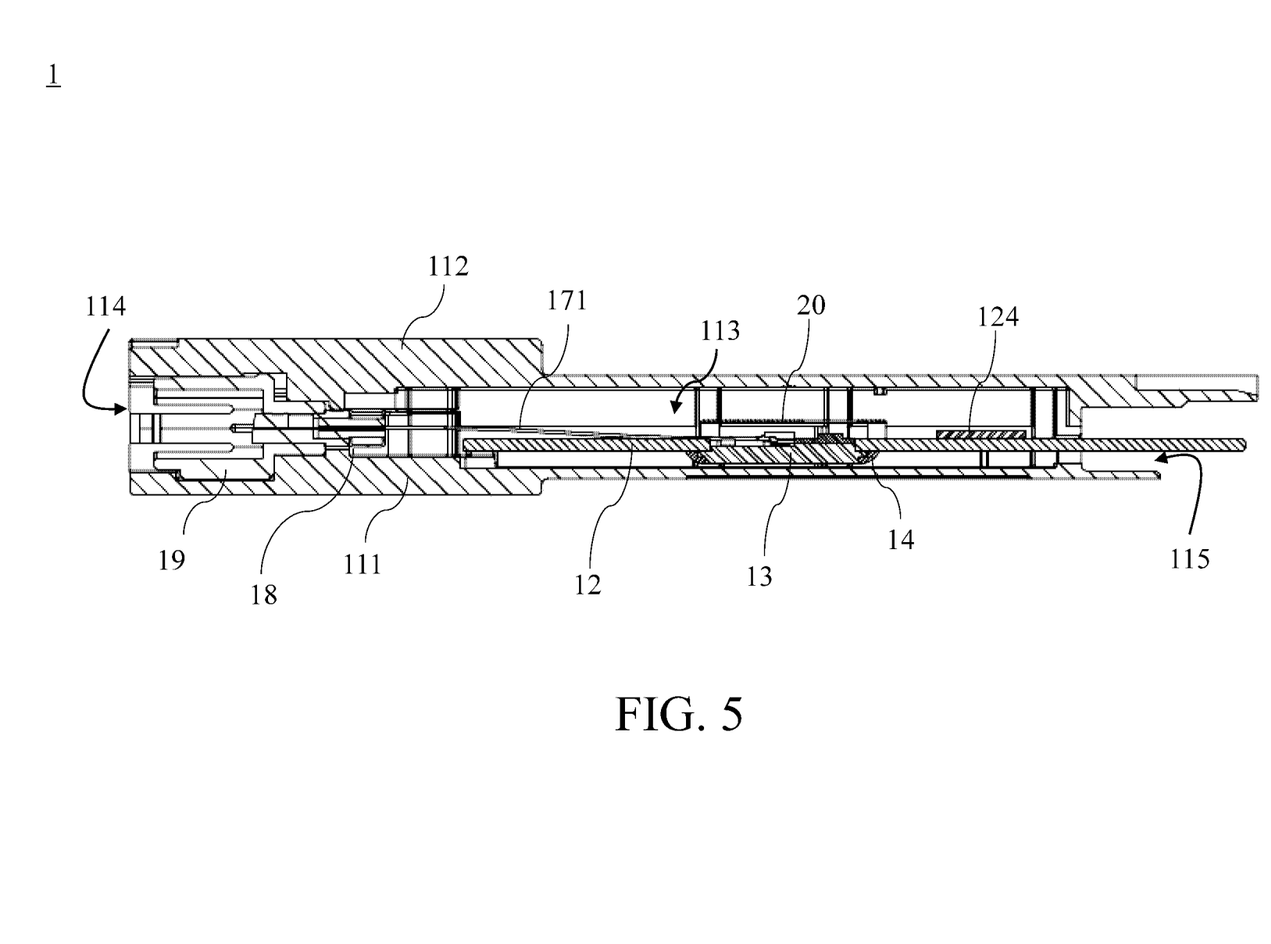
FIG. 5 is a sectional schematic diagram of the optical module of FIG. 1 along A-A line.
Figure 6:
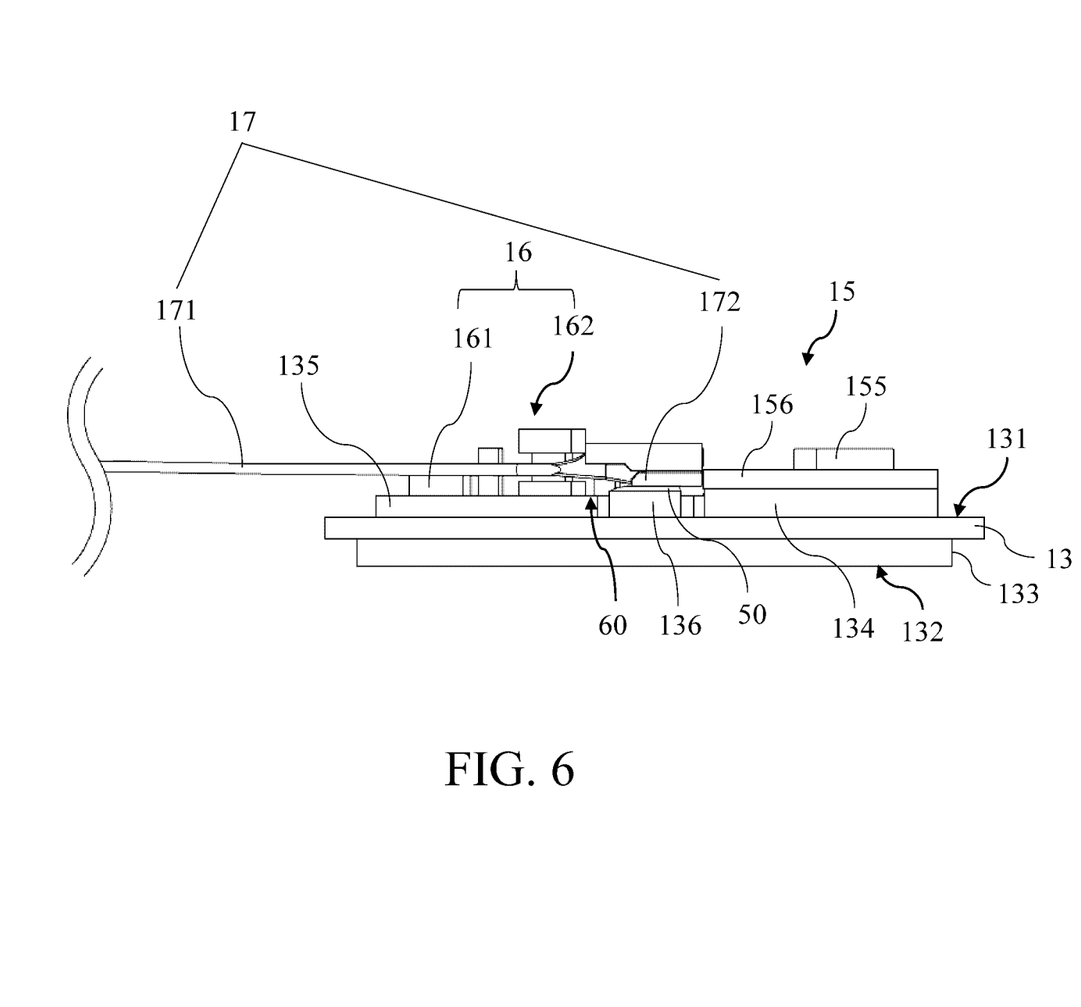
FIG. 6 is a configuration diagram of a side view of the thermally conductive substrate, the silicon photonic chip, the laser assembly and the optical fiber array assembly of FIG. 4.

Please refer to FIG. 1 to FIG. 6, wherein FIG. 1 is a combination diagram of an optical module according to an embodiment of the present disclosure, FIG. 2 is an exploded schematic diagram of a first perspective view of the optical module of FIG. 1, FIG. 3 is an exploded schematic diagram of a second perspective view of the optical module of FIG. 1, FIG. 4 is a partial exploded view of the optical module of FIG. 2, FIG. 5 is a sectional schematic diagram of the optical module of FIG. 1 along A-A line, and FIG. 6 is a configuration diagram of a side view of the thermally conductive substrate, the silicon photonic chip, the laser assembly and the optical fiber array assembly of FIG. 4. As shown in FIG. 1 to FIG. 6, the optical module 1 comprises a housing 11, a circuit board 12, a thermally conductive substrate 13, a structural adhesive 14, a silicon photonic chip 15, a laser assembly 16, an optical fiber array assembly 17, an optical fiber head 18, and an optical connector 19.

In this embodiment, the housing 11 may comprise a lower housing 111 and an upper housing 112. The upper housing 112 is covered with the lower housing 111 to form an accommodating space 113. The circuit board 12, the thermally conductive substrate 13, the structural adhesive 14, the silicon photonic chip 15, the laser assembly 16 and the optical fiber array assembly 17 are disposed in the accommodating space 113 (i.e., the circuit board 12, the thermally conductive substrate 13, the structural adhesive 14, the silicon photonic chip 15, the laser assembly 16 and the optical fiber array assembly 17 are disposed in the housing 11). The lower housing 111 and the upper housing 112 can be made of metal material, which is beneficial to achieve electromagnetic shielding and heat dissipation. In addition, the housing 11 has a first opening 114 and a second opening 115 connected to the accommodating space 113, the optical connector 19 is disposed in the first opening 114 to form an optical interface of the optical module 1 for transmitting optical signals. One end of the circuit board 12 protruding from the second opening 115 is provided with a gold finger 122 to form an electrical interface of the optical module 1 to electrically connect to a host computer (not shown) such as an optical network unit and an optical line terminal for transmitting electrical signals.

In this embodiment, the circuit board 12 is provided with a through opening 121. The circuit board 12 can be a rigid circuit board or use a rigid circuit board and a flexible circuit board together. In one example, the circuit board 12 may be a printed circuit board.

Please refer to FIG. 4 to FIG. 7, and FIG. 7 is a three-dimensional structure schematic diagram of the thermally conductive substrate of FIG. 4. As shown in FIG. 4 to FIG. 7, the thermally conductive substrate 13 is fixed to the circuit board 12, and the thermally conductive substrate 13 comprises a first surface 131, a second surface 132, a connecting end 133, a first bearing seat 134, a second bearing seat 135 and a third bearing seat 136. The first surface 131 and the second surface 132 are opposite to each other, the connecting end 133 connects the first surface 131 and the second surface 132, and the first bearing seat 134, the second bearing seat 135 and the third bearing seat 136 are disposed on the first surface 131. The area of the second surface 132 is smaller than that of the first surface 131, part of the first surface 131 contacts the circuit board 12, and the first bearing seat 134, the second bearing seat 135 and the third bearing seat 136 are exposed from the through opening 121. The structural adhesive 14 covers the connecting end 133 and part of the circuit board 12 to fix the thermally conductive substrate 13 to the circuit board 12. The thermally conductive substrate 13 is made of a thermally conductive material, including but not limited to an aluminum alloy, a copper alloy or an iron alloy, and the structural adhesive 14 is made of a high-strength material, such as a block epoxy encapsulant, to firmly fix the thermally conductive substrate 13 to the circuit board 12. In one example, the lap shear strength of the high-strength material may be greater than 2000 Psi (Pounds per square inch).

Figure 7:
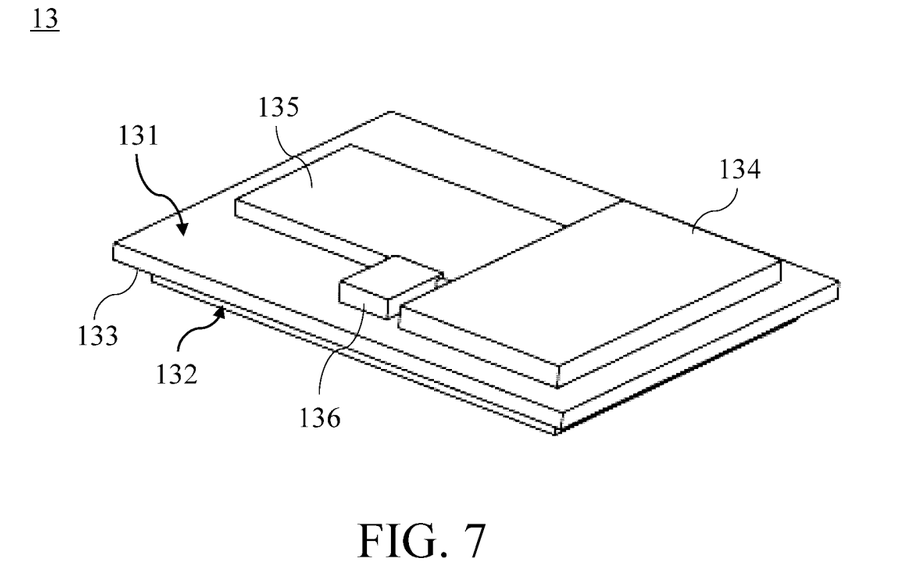
FIG. 7 is a three-dimensional structure schematic diagram of the thermally conductive substrate of FIG. 4.

Because the area of the second surface 132 is smaller than that of the first surface 131, the connecting end 133 has an indented structure, which is helpful for the structural adhesive 14 to fill the inverted structure, thereby increasing the bonding firmness between the thermally conductive substrate 13 and the circuit board 12. In an example, the connecting end 133 may have a stepped structure, and the force on the shearing direction of the structural adhesive 14 may be reduced through the design of the stepped structure. In addition, since the area of the first surface 131 of the thermally conductive substrate 13 is larger than the size of the opening 121 of the circuit board 12, when the thermally conductive substrate 13 is fixed to the circuit board 12, part of the first surface 131 contacts the circuit board 12, and the first bearing seat 134, the second bearing seat 135 and the third bearing seat 136 are exposed from the through opening 121.

Figure 8:
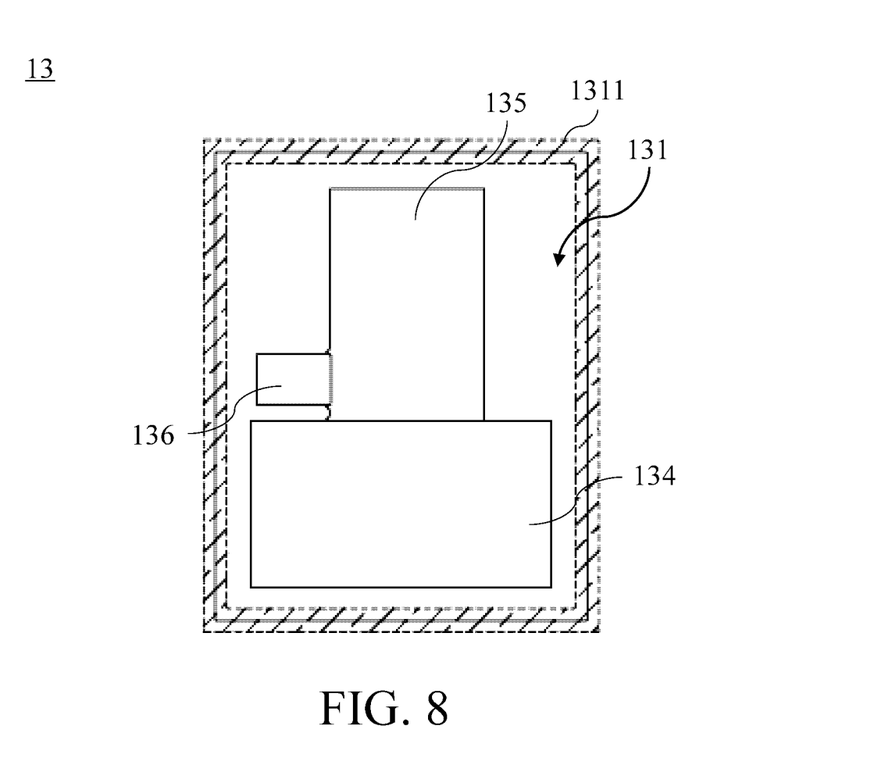
FIG. 8 is a top view of the thermally conductive substrate of FIG. 4.

In an embodiment, please refer to FIG. 4, FIG. 6 and FIG. 8, and FIG. 8 is a top view of the thermally conductive substrate of FIG. 4. As shown in FIG. 4, FIG. 6 and FIG. 8, the first surface 131 of the thermally conductive substrate 13 is provided with a bonding region 1311 where the diagonal lines are drawn as shown in FIG. 8, and the bonding region 1311 is glued to the circuit board 12 by a bonding glue (not drawn), so that a part of the first surface 131 is attached to the circuit board 12 (i.e., part of the first surface 131 contacts the circuit board 12), thereby increasing the bonding firmness between the thermally conductive substrate 13 and the circuit board 12. The bonding region 1311 may be an edge area of the first surface 131, the material of the bonding glue may be, but not limited to, a thermally conductive material, such as a thermally conductive silver glue and a thermally conductive silica gel, and the bonding glue has the effect of uniformly distributing the heat energy generated by the components on the thermally conductive substrate 13 and the circuit board 12 (e.g., the silicon photonic chip 15 and the laser assembly 16).

Figure 9:
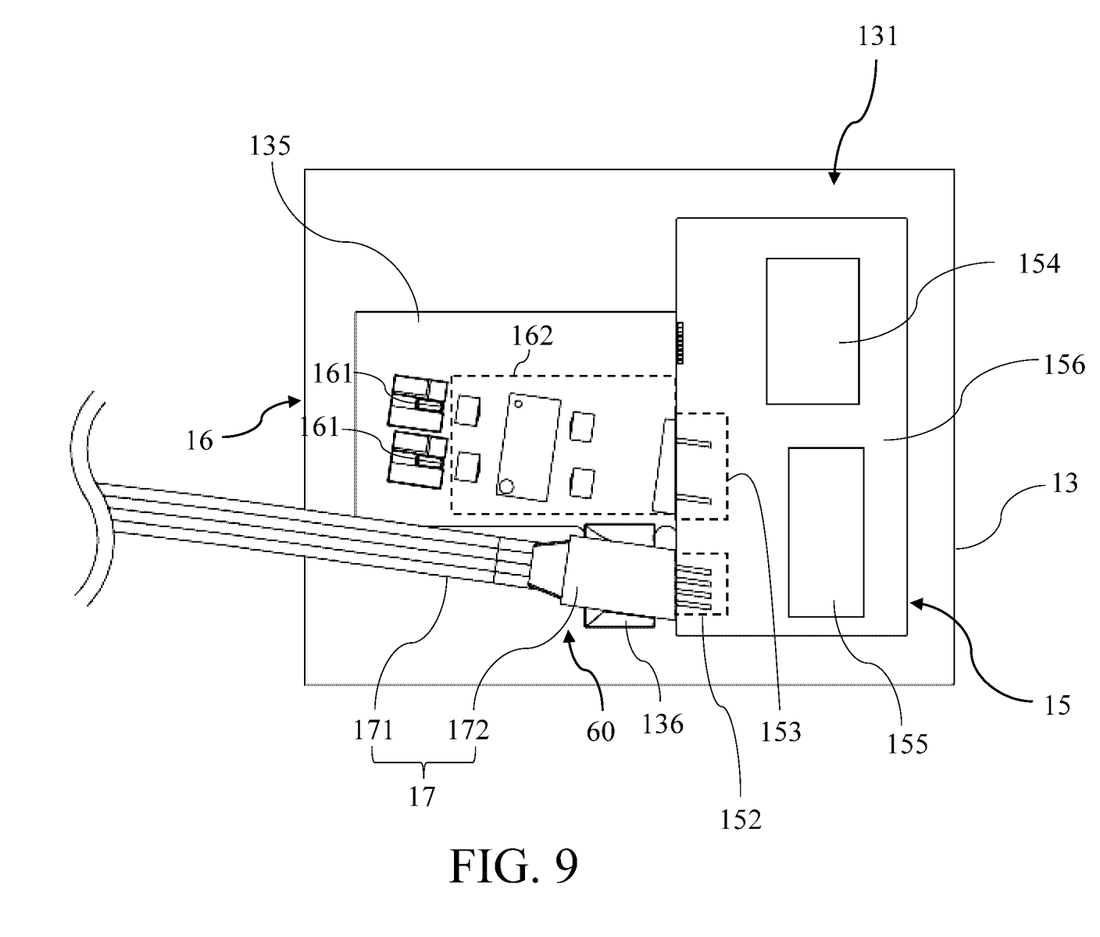
FIG. 9 is a configuration diagram of a top view of the thermally conductive substrate, the silicon photonic chip, the laser assembly and the optical fiber array assembly of FIG. 6.

Please refer to FIG. 6 and FIG. 9, and FIG. 9 is a configuration diagram of a top view of the thermally conductive substrate, the silicon photonic chip, the laser assembly and the optical fiber array assembly of FIG. 6. As shown in FIG. 6 and FIG. 9, the silicon photonic chip 15 is disposed on the first bearing seat 134 and is electrically connected to the circuit board 12, and the silicon photonic chip 15 is configured to output a first optical signal and receiving a second optical signal and a third optical signal. The laser assembly 16 is disposed on the second bearing seat 135 and is configured to provide the third optical signal to the silicon photonic chip 15. The optical fiber array assembly 17 comprises an optical fiber array 171 and a joint 172, and the joint 172 is configured to fix an end of the optical fiber array 171. The joint 172 is glued to the third bearing seat 136 to make the optical fiber array 171 coupled and connected to the silicon photonic chip 15, to receive the first optical signal from the silicon photonic chip 15 and provide the second optical signal to the silicon photonic chip 15.

Specifically, the silicon photonic chip 15 may comprise a first optical port group 152 for outputting the first optical signal and receiving the second optical signal, and a second optical port group 153 for receiving the third optical signal, a driver chip 154 for driving the laser assembly 16 to provide the third optical signal, a trans-impedance amplifier (TIA) chip 155 for amplifying the second optical signal transmitted to the silicon photonic chip 15, and a silicon-based substrate 156, wherein the first optical port group 152, the second optical port group 153, the driver chip 154 and the transimpedance amplifier chip 155 are disposed on the silicon-based substrate 156, and the silicon-based substrate 156 is disposed on the first bearing seat 134, but this embodiment is not intended to limit the present disclosure.

In an example, the silicon-based substrate 156 having the first optical port group 152 and the second optical port group 153, the driver chip 154 and the transimpedance amplifier chip 155 are disposed on the first bearing seat 134 and are located on the same plane, so as to avoid the transmission loss of the first optical signal, the second optical signal and the third optical signal. In another example, the driver chip 154 and the transimpedance amplifier chip 155 are disposed on the silicon-based substrate 156 having the first optical port group 152 and the second optical port group 153 as shown in FIG. 9.

Figure 10:
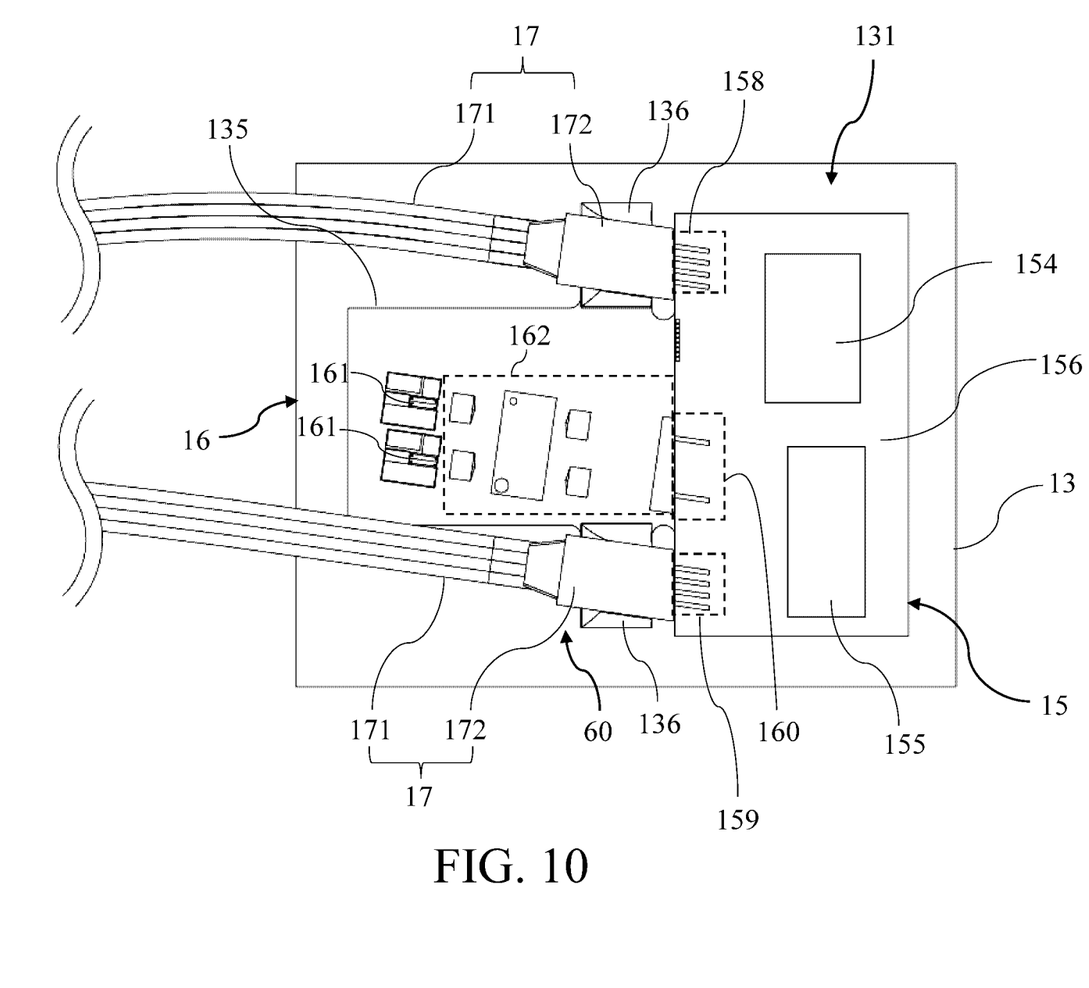
FIG. 10 is a configuration diagram of a top view of a thermally conductive substrate, a silicon photonic chip, a laser assembly and two optical fiber array assemblies according to an embodiment of the present disclosure.

In an example, when there are two optical fiber array assemblies 17 and the two optical fiber array assemblies 17 are configured to receive the first optical signal from the silicon photonic chip 15 and provide the second optical signal to the silicon photonic chip 15 respectively, the silicon photonic chip 15 may comprise an outputting optical port group 158 for outputting the first optical signal, a first inputting optical port group 159 for receiving the second optical signal, a second inputting optical port group 160 for receiving the third optical signal, the driver chip 154 for driving the laser assembly 16 to provide the third optical signal, the transimpedance amplifier chip 155 for amplifying the second optical signal transmitted to the silicon photonic chip 15, and the silicon-based substrate 156 as shown in FIG. 10, which is a configuration diagram of a top view of a thermally conductive substrate, a silicon photonic chip, a laser assembly and two optical fiber array assemblies according to an embodiment of the present disclosure. The optical fiber array 171 coupled with the outputting optical port group 158 is a transmitting-end optical fiber array, and the optical fiber array 171 coupled with the first inputting optical port group 159 is a receiving-end optical fiber array, so that the transmitting-end optical fiber array receives the first optical signal from the outputting optical port group 158, and the receiving-end optical fiber array provides the second optical signal to the first inputting optical port group 159.

The laser assembly 16 may comprise a laser chip 161 and an optical coupling assembly 162, wherein the laser chip 161 is electrically connected to the driver chip 154 for sending the third optical signal, and the optical coupling assembly 162 comprises a plurality of optical elements, such as lenses, reflectors and optical isolators, for guiding the third optical signal emitted by the laser chip 161 to the second optical port group 153 of the silicon photonic chip 15 (that is, the light outlet of the laser assembly 16 is coupled with the second optical port group 153). The number of laser chips 161 and the optical coupling assemblies 162 corresponding thereto can be adjusted according to actual needs. When the number of laser chips 161 is multiple, the third optical signals provided by the multiple laser chips 161 may be optical signals of the same wavelength or optical signals of different wavelengths.

One end of the optical fiber array 171 is connected to the joint 172, the other end of the optical fiber array 171 is connected to the optical fiber head 18, and the optical fiber head 18 is connected to the optical connector 19 as shown in FIG. 4. The number of optical fibers included in the optical fiber array 171 can be adjusted according to actual needs. The joint 172 may be glued to the third bearing seat 136 through the glue 50 to make the optical fiber array 171 coupled and connected to the first optical port group 152 of the silicon photonic chip 15, so that the optical fiber array 171 receives the first optical signal from the silicon photonic chip 15 and provides the second optical signal to the silicon photonic chip 15.

It should be noted that, through the design that the joint 172 is glued to the third bearing seat 136, the height of the third bearing seat 136 is used to control the amount of glue between the joint 172 and the third bearing seat 136, so as to prevent the excessive amount of glue from causing excessive volume collapse during the curing process, thereby causing the failure of the coupling between the optical fiber array 171 and the first optical port group 152. In addition, a clearance area 60 (i.e., a clearance gap) is provided between the optical fiber array 171 near the joint 172 and the thermally conductive substrate 13. Through the design that the joint 172 is glued to the third bearing seat 136 and the clearance area 60, the glue overflowing between the connector 172 and the third bearing seat 136 flows down along the side wall of the third bearing seat 136, so as to prevent the glue connection between the optical fiber array 171 and other components during the assembly process, there is glue connection between the 171 and other components (that is, the clearance treatment is performed on the optical fiber array 171) to avoid damage during repair and disassembly. In addition, by controlling the amount of glue used to fix the optical fiber array 171, the volume change during the curing process of the glue is guaranteed to be within a controllable range. Furthermore, through the design that the silicon photonic chip 15 is disposed on the first bearing seat 134, the laser assembly 16 is disposed on the second bearing seat 135, and the joint of the optical fiber array assembly 17 is disposed on the third bearing seat 136, all optical components used for transmitting optical signals (i.e., the silicon photonic chip 15, the laser assembly 16 and the optical fiber array assembly 17) are disposed on the thermally conductive substrate 13, and the first bearing seat 134, the second bearing seat 135, and the third bearing seat 136 have the same expansion coefficient, so as to ensure stable optical performance under different temperature environments.

Please refer to FIG. 4, FIG. 6 and FIG. 9, in the optical module 1, the silicon photonic chip 15 may control the driver chip 154 to drive the laser assembly 16 to provide the third optical signal based on the electrical signal from the electronic chip 124, and perform modulation processing on the third optical signal received from the second optical port group 153 to output the first optical signal through the first optical port group 152. The first optical signal is output to information processing equipment (not shown) such as routers, switches, and electronic computers through the optical fiber array 171, the optical fiber head 18 and the optical connector 19 in sequence. The first optical port group 152 of the silicon photonic chip 15 may receive the second optical signal from the information processing equipment through the optical connector 19, the optical fiber head 18 and the optical fiber array 171 in sequence. The transimpedance amplifier chip 155 amplifies the second optical signal and converts it into an electrical signal and transmits it to the electronic chip 124, and the electronic chip 124 transmits the electrical signal from the silicon photonic chip 15 to the host computer through the golden finger 122.

Figure 11:
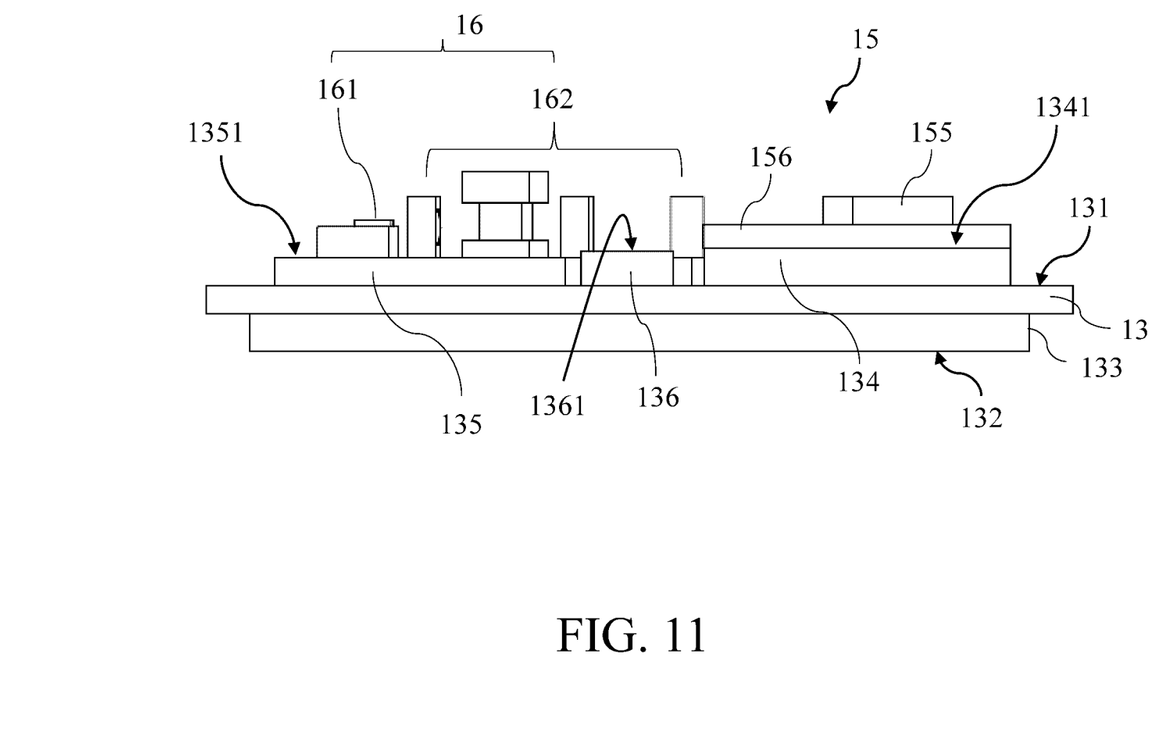
FIG. 11 is a configuration diagram of a side view of the thermally conductive substrate, the silicon photonic chip and the laser assembly of FIG. 4.

Please refer to FIG. 9 and FIG. 11, and FIG. 11 is a configuration diagram of a side view of the thermally conductive substrate, the silicon photonic chip and the laser assembly of FIG. 4. As shown in FIG. 11, the top surface 1341 of the first bearing seat 134 is higher than the top surface 1351 of the second bearing seat 135 and the top surface 1361 of the third bearing seat 136. Therefore, the heights of the first bearing seat 134, the second bearing seat 135 and the third bearing seat 136 can be used to control the coupling efficiency between the optical fiber array 171 and the first optical port group 152, as well as the coupling efficiency between the light outlet of the laser assembly 16 and the second optical port group 153.

In one embodiment, the optical fiber array 171 is aligned and coupled to the first optical port group 152 through the joint 172 disposed on the third bearing seat 136 (that is, the light outlet of the optical fiber array 171 and the first optical port group 152 are located in the same horizontal plane) to receive the first optical signal from the silicon photonic chip 15 and provide the second optical signal to the silicon photonic chip 15. The laser assembly 16 is disposed on the second bearing seat 135 to align and couple its light outlet with the second optical port group 153 (that is, the light outlet of the laser assembly 16 and the second optical port group 153 are located in the same horizontal plane), so as to provide the third optical signal to the silicon photonic chip 15. That is to say, the first surface 131 of the thermally conductive substrate 13 is provided with bearing seats of different heights for placing optical components with different optical center heights (i.e., the silicon photonic chip 15, the laser assembly 16 and the optical fiber array assembly 17), to make the optical center height of all optical components located in the same horizontal plane, thereby increasing the coupling efficiency.

In one embodiment, the optical module 1 may further comprise a protective cover 20, which is fixed on the circuit board 12 to form a protective space with the circuit board 12, and the silicon photonic chip 15 and the laser assembly 16 are disposed in the protective space as shown in FIG. 2 and FIG. 4.

In one embodiment, in order to prevent the protective cover 20 from affecting the heat dissipation effect of the optical module 1, the protective cover 20 is provided with a heat dissipation opening 201, and the heat dissipation opening 201 corresponds to the silicon photonic chip 15 as shown in FIG. 2 and FIG. 4. Since the silicon photonic chip 15 generates more heat energy than other components during operation, the position of the heat dissipation opening 201 corresponds to the disposition position of the silicon photonic chip 15.

In one embodiment, the second surface 132 is thermally connected to the housing 11 as shown in FIG. 5. In an example, the second surface 132 may directly contact the lower housing 111 of the housing 11 to guide the heat energy of the thermally conductive substrate 13 to the lower housing 111 for heat dissipation. In another example, there is a gap between the second surface 132 and the lower housing 111, and the second surface 132 can contact the lower housing 111 through thermal paste, so as to guide the heat energy of the thermally conductive substrate 13 to the lower housing 111 for heat dissipation.

Figure 12:
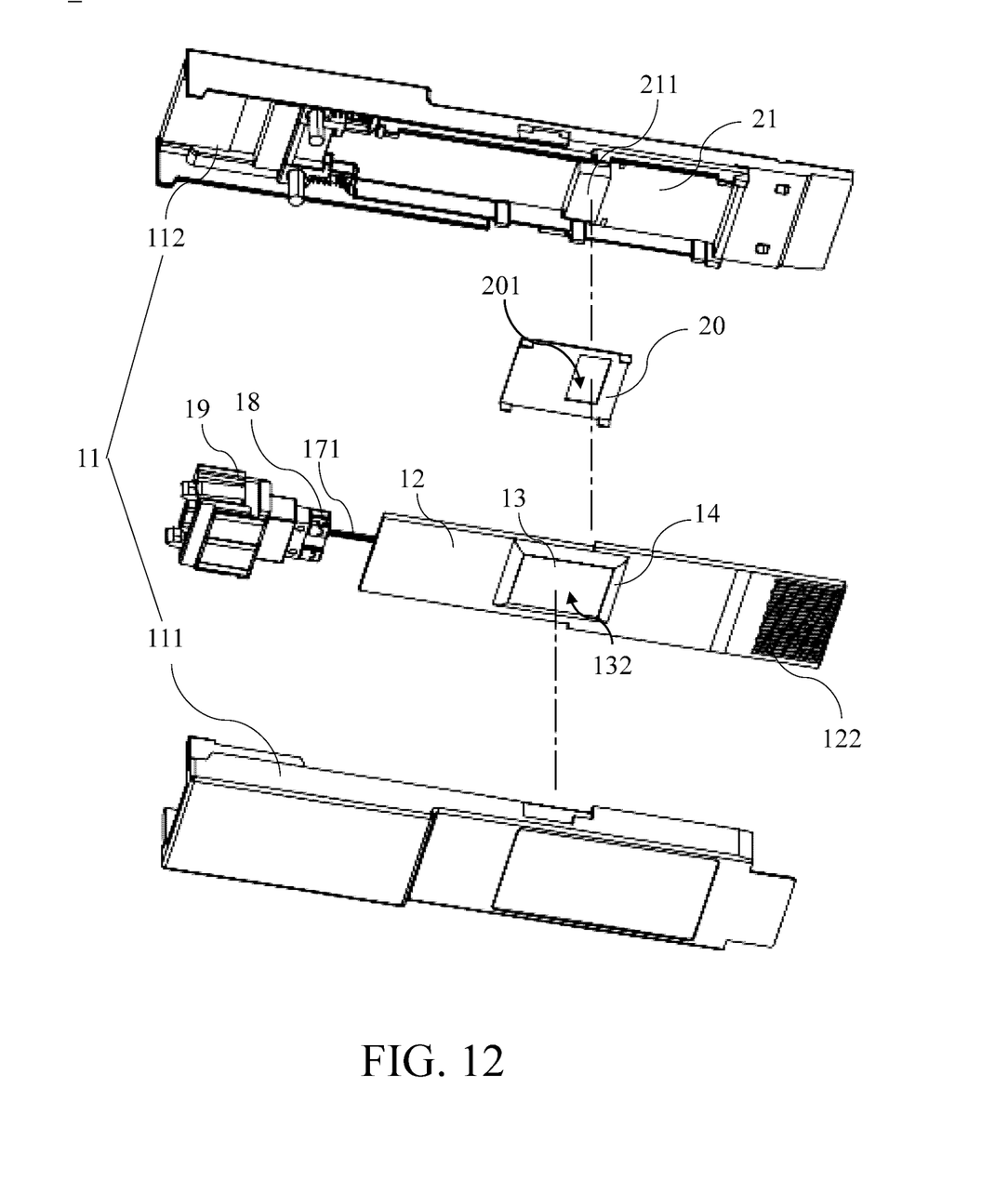
FIG. 12 is an exploded schematic diagram of another embodiment of the optical module of FIG. 1.

Please refer to FIG. 12, which is an exploded schematic diagram of another embodiment of the optical module of FIG. 1. As shown in FIG. 12, the optical module 1 may further comprise a heat dissipation element 21. The heat dissipation element 21 is disposed in the housing 11, the heat dissipation element 21 is disposed on the surface of the housing 11 facing the silicon photonic chip 15 (that is, the heat dissipation element 21 is disposed in the upper housing 112), and the heat dissipation element 21 is thermally connected to the silicon photonic chip 15.

In one embodiment, the heat dissipation element 21 comprises a heat dissipation bump 211, and the heat dissipation bump 211 is accommodated in the heat dissipation opening 201 and is thermally connected to the silicon photonic chip 15. Specifically, when the upper housing 112 is covered on the lower housing 111, the heat dissipation bump 211 is accommodated in the heat dissipation opening 201 and is attached to the silicon photonic chip 15 through the heat dissipation glue, so as to effectively guide the heat energy generated by the silicon photonic chip 15 to the upper housing 112 for heat dissipation.

To sum up, the optical module of the present disclosure has the design that the area of the second surface is smaller than that of the first surface, so that the thermally conductive substrate is provided with an indentation structure, which is helpful for the structural adhesive to fill the inverted structure, thereby increasing the bonding firmness between the thermally conductive substrate and the circuit board. In addition, through the design that the silicon photonic chip is disposed on the first bearing seat, the laser assembly is disposed on the second bearing seat, and the joint of the optical fiber array assembly is disposed on the third bearing seat, all optical components used for transmitting optical signals (i.e., the silicon photonic chip, the laser assembly and the fiber array assembly) are disposed on the thermally conductive substrate, and the first bearing seat, the second bearing seat, and the third bearing seat have the same expansion coefficient, so as to ensure stable optical performance under different temperature environments. Besides, the amount of glue between the joint and the third bearing seat is controlled by the height of the third bearing seat, so as to prevent the excessive amount of glue from causing excessive volume collapse during the curing process, thereby causing the failure of the coupling between the optical fiber array and the first optical port group. Moreover, the coupling efficiency between the optical fiber array and the first optical port group is improved, and the coupling efficiency between the light outlet of the laser assembly and the second optical port group is improved through the heights of the first bearing seat, the second bearing seat and the third bearing seat. Furthermore, through the design that the joint is glued to the third bearing seat, the optical fiber array can be prevented from being glued to other components during the assembly process, thereby avoiding damage during repair and disassembly.

Although the present disclosure is disclosed in the foregoing embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. An optical module, comprising:
   a circuit board provided with a through hole;
   a thermally conductive substrate fixed to the circuit board and comprising a first surface, a second surface, a connecting end, a first bearing seat, a second bearing seat and a third bearing seat; wherein the first surface and the second surface are opposite to each other; the connecting end connects the first surface and the second surface; the first bearing seat, the second bearing seat and the third bearing seat are disposed on the first surface; the area of the second surface is smaller than that of the first surface; part of the first surface contacts the circuit board; and the first bearing seat, the second bearing seat and the third bearing seat are exposed from the through opening;
   a structural adhesive covering the connecting end and part of the circuit board to fix the thermally conductive substrate on the circuit board;
   a silicon photonic chip disposed on the first bearing seat, electrically connected to the circuit board, and configured to output a first optical signal and receive a second optical signal and a third optical signal;
   a laser assembly disposed on the second bearing seat and configured to provide the third optical signal to the silicon photonic chip; and
   an optical fiber array assembly comprising an optical fiber array and a joint configured to fix an end of the optical fiber array, wherein the joint is glued to the third bearing seat to make the optical fiber array coupled and connected with the silicon photonic chip, to receive the first optical signal from the silicon photonic chip and provide the second optical signal to the silicon photonic chip; and a clearance area is provided between the optical fiber array near the joint and the thermally conductive substrate.

2. The optical module according to claim 1, wherein the first surface is provided with a bonding region, and the bonding region is glued to the circuit board by a bonding glue, so that part of the first surface is attached to the circuit board.

3. The optical module according to claim 2, further comprising a housing and a heat dissipation element, wherein the circuit board, the thermally conductive substrate, the structural adhesive, the silicon photonic chip, the laser assembly, the optical fiber array assembly and the heat dissipation element are disposed in the housing; the heat dissipation element is disposed on a surface of the housing facing the silicon photonic chip; and the heat dissipation element is thermally connected to the silicon photonic chip.

4. The optical module according to claim 2, wherein a top surface of the first bearing seat is higher than a top surface of the second bearing seat and a top surface of the third bearing seat.

5. The optical module according to claim 2, wherein the material of the bonding glue is a thermally conductive material, and the material of the structural adhesive is a high-strength material.

6. The optical module according to claim 5, further comprising a housing and a heat dissipation element, wherein the circuit board, the thermally conductive substrate, the structural adhesive, the silicon photonic chip, the laser assembly, the optical fiber array assembly and the heat dissipation element are disposed in the housing; the heat dissipation element is disposed on a surface of the housing facing the silicon photonic chip; and the heat dissipation element is thermally connected to the silicon photonic chip.

7. The optical module according to claim 5, wherein a top surface of the first bearing seat is higher than a top surface of the second bearing seat and a top surface of the third bearing seat.

8. The optical module according to claim 1, further comprising a housing and a heat dissipation element, wherein the circuit board, the thermally conductive substrate, the structural adhesive, the silicon photonic chip, the laser assembly, the optical fiber array assembly and the heat dissipation element are disposed in the housing; the heat dissipation element is disposed on a surface of the housing facing the silicon photonic chip; and the heat dissipation element is thermally connected to the silicon photonic chip.

9. The optical module according to claim 8, further comprising a protective cover, wherein the protective cover is fixed on the circuit board to form a protective space with the circuit board; and the silicon photonic chip and the laser assembly are disposed in the protective space.

10. The optical module according to claim 9, wherein the protective cover is provided with a heat dissipation opening, and the heat dissipation opening corresponds to the silicon photonic chip.

11. The optical module according to claim 10, wherein the heat dissipation element comprises a heat dissipation bump, and the heat dissipation bump is accommodated in the heat dissipation opening and is thermally connected to the silicon photonic chip.

12. The optical module according to claim 8, wherein the second surface is thermally connected to the housing.

13. The optical module according to claim 1, wherein a top surface of the first bearing seat is higher than a top surface of the second bearing seat and a top surface of the third bearing seat.

14. The optical module according to claim 13, wherein the silicon photonic chip comprises a first optical port group configured to output the first optical signal and receive the second optical signal and a second optical port group configured to receive the third optical signal; the optical fiber array is aligned and coupled to the first optical port group through the joint disposed on the third bearing seat, so as to receive the first optical signal from the silicon photonic chip and provide the second optical signal to the silicon photonic chip; and the laser assembly is disposed on the second bearing seat to align and couple a light outlet of the laser assembly with the second optical port group to provide the third optical signal to the silicon photonic chip.

15. The optical module according to claim 1, wherein the connecting end has a stepped structure.

* * * * *